United States Patent [19]
Smith et al.

[11] Patent Number: 6,061,448
[45] Date of Patent: May 9, 2000

[54] METHOD AND SYSTEM FOR DYNAMIC SERVER DOCUMENT ENCRYPTION

[75] Inventors: Jeffrey C. Smith, Menlo Park; Jean-Christophe Bandini, Cupertino, both of Calif.

[73] Assignee: Tumbleweed Communications Corp., Redwood City, Calif.

[21] Appl. No.: 08/829,976

[22] Filed: Apr. 1, 1997

[51] Int. Cl.[7] .................................................. H04L 9/00
[52] U.S. Cl. .................................. 380/21; 380/49; 380/25
[58] Field of Search .................................. 380/21, 49, 23, 380/25; 379/201; 340/825.31, 825.34; 709/223, 224, 229

[56] References Cited

U.S. PATENT DOCUMENTS

| | | | |
|---|---|---|---|
| 4,532,588 | 7/1985 | Foster | 364/200 |
| 4,713,780 | 12/1987 | Schultz et al. | 364/514 |
| 4,754,428 | 6/1988 | Schultz et al. | 364/900 |
| 4,837,798 | 6/1989 | Cohen et al. | 379/88 |
| 4,853,961 | 8/1989 | Pastor | 380/21 |
| 5,008,814 | 4/1991 | Mathur | 364/200 |
| 5,210,824 | 5/1993 | Putz et al. | 395/145 |
| 5,235,642 | 8/1993 | Wobber | 380/25 |
| 5,293,250 | 3/1994 | Okumura et al. | 358/402 |
| 5,313,521 | 5/1994 | Torii et al. | 380/21 |
| 5,404,231 | 4/1995 | Bloomfiled | 358/400 |
| 5,406,557 | 4/1995 | Baudoin | 370/61 |
| 5,416,842 | 5/1995 | Aziz | 380/30 |
| 5,424,724 | 6/1995 | Williams et al. | 340/825.05 |
| 5,495,610 | 2/1996 | Shing et al. | 395/600 |
| 5,509,074 | 4/1996 | Choudhury et al. | 380/23 |
| 5,513,126 | 4/1996 | Harkins et al. | 364/514 A |
| 5,535,276 | 7/1996 | Ganesan | 380/25 |
| 5,550,984 | 8/1996 | Gelb | 395/200.17 |
| 5,608,874 | 3/1997 | Ogawa et al. | 395/200.15 |
| 5,675,507 | 10/1997 | Bobo, II | 364/514 R |
| 5,677,955 | 10/1997 | Doggett et al. | 380/24 |
| 5,706,442 | 1/1998 | Anderson et al. | 395/227 |
| 5,708,780 | 1/1998 | Levergood et al. | 395/200.12 |
| 5,710,883 | 1/1998 | Hong et al. | 395/200.17 |
| 5,727,156 | 3/1998 | Herr-Hoyman et al. | 395/200.49 |
| 5,751,956 | 5/1998 | Kirsch | 395/200.33 |
| 5,758,343 | 5/1998 | Vigil et al. | 707/10 |
| 5,764,906 | 6/1998 | Edelstein et al. | 395/200.49 |
| 5,778,372 | 7/1998 | Cordell et al. | 707/100 |
| 5,781,901 | 7/1998 | Kuzma | 707/10 |
| 5,790,793 | 8/1998 | Higley | 395/200.48 |
| 5,793,972 | 8/1998 | Shane | 395/200.49 |
| 5,805,719 | 9/1998 | Pare, Jr. et al. | 382/115 |
| 5,812,776 | 9/1998 | Gifford | 395/200.47 |
| 5,845,084 | 12/1998 | Cordell et al. | 395/200.64 |
| 5,850,442 | 12/1998 | Muftic | 380/21 |
| 5,855,020 | 12/1998 | Kirsch | 707/10 |
| 5,860,068 | 1/1999 | Cook | 705/26 |
| 5,903,723 | 5/1999 | Becker et al. | 395/200.3 |

*Primary Examiner*—Gail O. Hayes
*Assistant Examiner*—Ho S. Song
*Attorney, Agent, or Firm*—James D. Ivey; Michael A. Glenn

[57] ABSTRACT

A method and system are provided for secure document delivery over a wide area network, such as the Internet. A sender directs a Delivery Server to retrieve an intended recipient's public key. The Delivery Server dynamically queries a certificate authority and retrieves the public key. The public key is transmitted from the Delivery Server to the sender. The sender encrypts the document using a secret key and then encrypts the secret key using the public key. Both encrypted document and encrypted secret key are uploaded to the Delivery Server, and transmitted to the intended recipient. The intended recipient then uses the private key associated with the public key to decrypt the secret key, and uses the secret key to decrypt the document. In an alternative, equally preferred embodiment of the invention, the sender uses the public key to encrypt the document. In yet another embodiment, the server transmits the document to the Delivery Server for encryption.

27 Claims, 5 Drawing Sheets

METHOD AND SYSTEM FOR DYNAMIC SERVER DOCUMENT ENCRYPTION

BACKGROUND OF THE INVENTION

1. Technical Field

The invention relates to communication on an electronic network. More particularly, the invention relates to a method and system for providing secure document delivery over a wide area network, such as the Internet.

2. Description of the Prior Art

The Internet is increasingly being used for communications. It is now possible on the Internet for a sender to direct a document to a specific recipient, regardless of platform, operating system, or email system. The sender's computer may be connected to the Internet directly, or through an intranet's server. Such communication is possible even when the recipient is not a computer but, rather, a fax machine or printer connected to the Internet.

This increase in Internet communications has necessitated the development of security systems to insure protection for information transmitted over the Internet. Encryption is a basic technique used to scramble information to prevent unsolicited access to that information. One well-known encryption scheme is secret key encryption, sometimes referred to as private key encryption or symmetric-key cryptography. Secret key encryption employs the technique of scrambling information using a unique key to prevent unsolicited access thereto.

Figure 1:
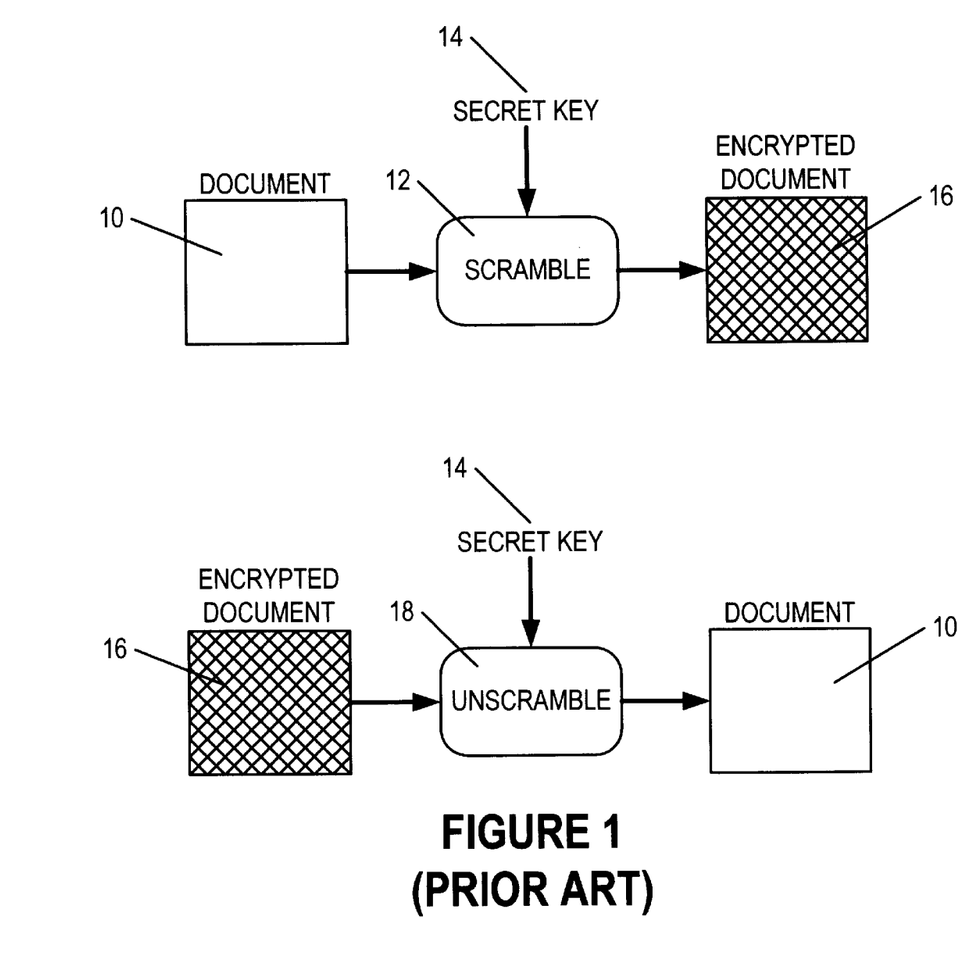
FIG. 1 is a diagram illustrating secret key encryption according to the prior art.

This unique key is then required to unscramble the information. FIG. 1 is a diagram illustrating secret key encryption, according to the prior art.

A document 10 is scrambled 12 using a secret key 14. A secret key is an encryption scheme that is only available to authorized users of the scheme. The encryption software may be located on the user's computer, or at a remote location. Thus, the document may be encrypted in situ, or upon transmission to another computer, such as an intranet server.

The resulting encrypted document 16 is then transmitted to the recipient. It is unscrambled 18 using the secret key 14 to regenerate the original document 10. The encrypted document cannot be accessed without the secret key. Again, the decryption software may be located on the recipient's computer, or at a remote location.

One potential problem associated with secret key encryption is the secure distribution of the secret key. If the secret key is sent over a non-secure channel, the integrity of the security is compromised. For most practical applications, telephone or fax provides adequate security for delivering secret keys, while the document can be delivered over the internet using such mail schemes as Posta, which is available from Tumbleweed Software Corporation of Redwood City, Calif. In some instances, however, users require a more secure, or more convenient, means of distributing a key.

Another known encryption scheme is public key encryption. In public key encryption, the sender and the recipient each own a pair of keys, called the public key and the private key. The owner of a key pair publishes the public key and keeps the private key a Secret.

The sender uses the published public key of the intended recipient to encrypt information. The information is decrypted using the recipient's private key. Thus, using public key encryption, no private key must be distributed.

Figure 2:
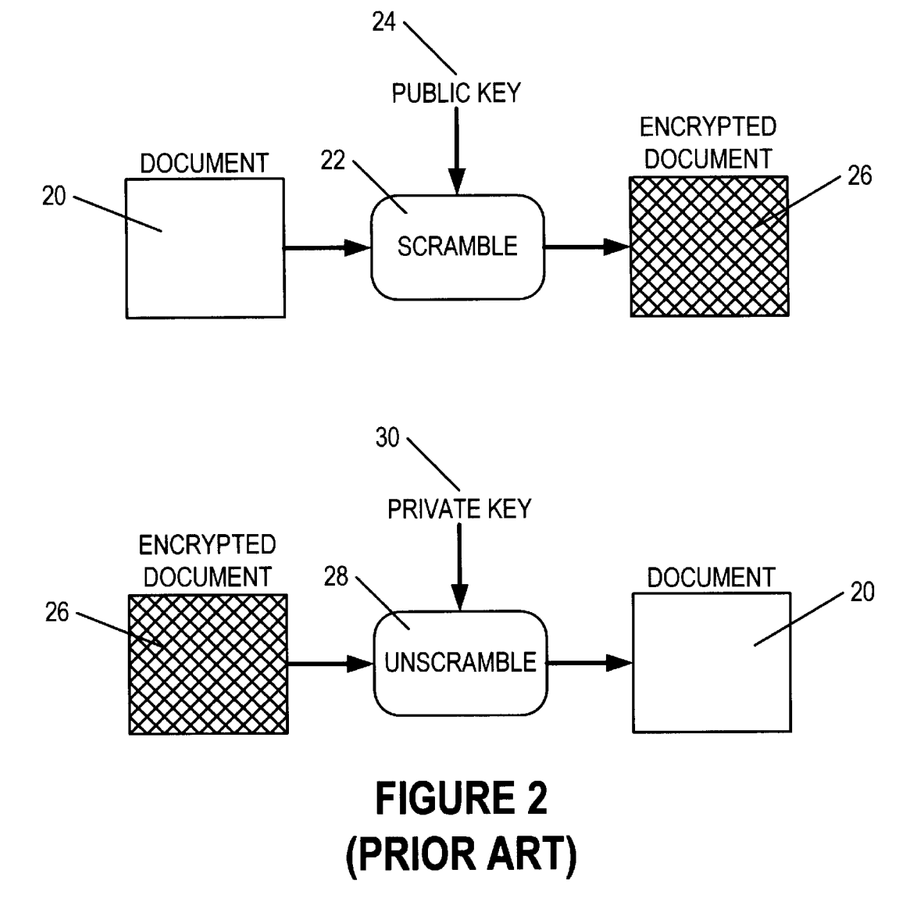
FIG. 2 is a diagram illustrating public key encryption according to the prior art.

FIG. 2 is a diagram illustrating public key encryption, according to the prior art. A document 20 is scrambled 22 using a public key 24. The resulting encrypted document 26 is then transmitted to the recipient. It is unscrambled 28 using the private key 30 to regenerate the original document 20.

The keys used in public key encryption are very large numbers. Public key encryption exploits an esoteric mathematical relationship between the key numbers to implement the encryption and decryption. As a result, the private key cannot readily be derived from the published public key.

It is often useful to verify that a document has not been altered during transmission, or to verify the sender or recipient of a document. Secret and public key technology provide such verification. However, public key encryption algorithms are typically complex and often are too time consuming to be of practical use. Secret key encryption is much faster, but there are difficulties associated with securely transmitting the key.

A public key/private key encryption system is described in Ganesan, Yaksha, An Improved System And Method For Securing Communications Using Split Private Key Asymmetric Cryptography, U.S. Pat. No. 5,535,276 Jul. 9, 1996). However, the Ganesan encryption scheme uses a complicated scheme for generating temporary keys and requires several different users to manually request public keys.

In Torii, Key Distribution Protocol For File Transfer In The Local Area Network, U.S. Pat. No. 5,313,521 May 17, 1991) a key distribution center is used to authenticate a terminal to a server. Pastor, Reliable Document Authentication System, U.S. Pat. No. 4,853,961 (Aug. 1, 1989) describes a document authentication system that includes a decryption key. Choudhury, et al, Method of Protecting Electronically Published Materials Using Cryptographic Protocols, U.S. Pat. No. 5,509,074 (Apr. 16, 1996) teaches a document protection system that includes a server-to-server security access operation to authenticate each document request. However, all of these prior art schemes require user intervention to authenticate the certificate.

Another encryption scheme, digital envelopes, is not subject to the disadvantages of secret key and public key encryption. Using digital envelopes, a sender encrypts a document with a secret key. The secret key is then encrypted with a public key. The recipient of the document then uses the recipient's private key to decrypt the secret key, and then the secret key to decrypt the document.

Registries are now available for publication of public keys. Such registries can certify that a particular public key belongs to a particular entity. For example, a certificate authority issues and maintains digital certificate that are used to connect entities to their specific public keys. The sender must query the registry to receive the requested public key information. This time-consuming process is inefficient, especially when the sender has a large number of documents to transmit to different recipients.

It would be an advantage to provide a system and method for automatically and dynamically retrieving a public key over a wide area network for encryption purposes. It would be a further advantage if such system and method uses a server to retrieve the certificate and requires no user intervention. It would be yet another advantage if the system and method does not transmit a document to the server until the server has returned the public key to the user.

SUMMARY OF THE INVENTION

The invention provides a method and system for secure document delivery over a wide area network, such as the Internet. A document is sent from sender to recipient via a Delivery Server. In the preferred embodiment of the invention, the Delivery Server is directed by the sender to retrieve the intended recipient's public key (certificate). The Delivery Server dynamically queries a certificate authority and retrieves the public key. The public key is transmitted from the Delivery Server to the sender.

The sender encrypts the document using a secret key. The secret key is then encrypted using the public key. Both encrypted document and encrypted secret key are uploaded to the Delivery Server, and transmitted to the intended recipient. The intended recipient then uses the private key associated with the public key to decrypt the secret key, and uses the secret key to decrypt the document.

In an alternative, equally preferred embodiment of the invention, the sender uses the public key to encrypt the document. The encrypted document is then transmitted to the intended recipient and decrypted using the private key associated with the public key.

In yet another embodiment, the server transmits the document to the Delivery Server for encryption. The Delivery Server queries the certificate authority in real time to retrieve the public key. The Delivery Server encrypts the document using a secret key, and then uses the public key to encrypt the secret key. The Delivery Server then transmits the encrypted document and the encrypted secret key to the intended recipient.

In the event that the Delivery Server query returns failure (no certificate available for the given user), the Delivery Server dynamically generates a new public key for the intended recipient. This new certificate is then used to encrypt the document.

DETAILED DESCRIPTION OF THE INVENTION

The invention provides a method and system for secure document delivery over a wide area network. A document Delivery Server dynamically retrieves a public key of an intended recipient of a document, then uses the public key to encrypt either a document or the secret key of the document. The see delivers the encrypted document to an intended recipient over a wide area network such as the Internet. The intended recipient decrypts the document using the private key associated with the public key. The invention permits only an intended recipient to gain access to a specific document and therefore provides a unique level of security for document delivery.

For the purposes of the invention, the term document includes any contiguous collection of data, including a stream of data, a video, audio data, an animation, a formatted document such as HTML, PDF, or Envoy, or a data base.

While the preferred embodiment of the invention is adapted for use in document transmission over the Internet, the invention is equally applicable to other wide area networks.

Furthermore, while the preferred embodiment of the invention discloses transmission of a document to a recipient computer, the invention is operable for document transmission to any intended recipient maintaining, or having the ability to dynamically generate, a private/public key and to use the private key to decrypt a document encrypted with the corresponding public key. An intended recipient, therefore, includes, for example, an Internet user of a desktop computer, printer, fax machine, personal digital assistant, or network computer device.

Similarly, while the sender of a document is preferably a desktop computer, the sender also includes any device capable of encrypting a document and communicating with the Delivery Server, such as a network computer device. In an alternative embodiment of the invention, the document is encrypted by the delivery server. In this embodiment, the sender includes any device, such as an Internet browser device, Internet telephone device, personal digital assistant, or fax machine, that can transmit a document to the Delivery Server for encryption and transmission to the intended recipient.

Figure 3:
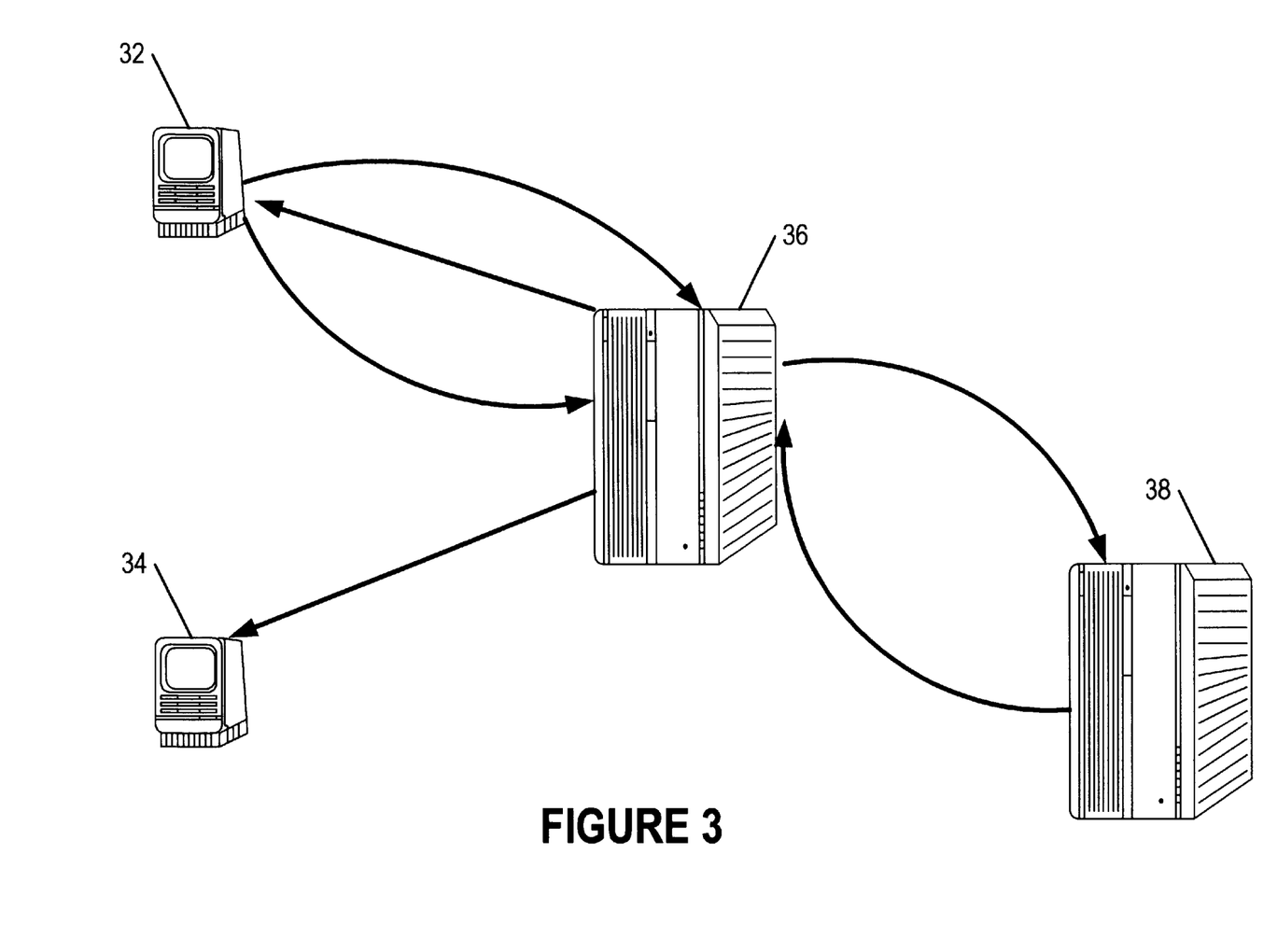
FIG. 3 is a diagram illustrating dynamic server document encryption according to a first preferred embodiment of the invention.

FIG. 3 is a diagram of a system for dynamic server document encryption, according to a first preferred embodiment of the invention. A document stored on a desktop computer, the sender 32, is to be transmitted to another computer, the intended recipient 34. In this first preferred embodiment, the document is stored in Portable Document Format (PDF). However, in alternative embodiments, a document may be stored in any appropriate format. Portable Document (PD) formats are required for distributed print and fax solutions. However, PD formats are not required for the invention.

The document is sent from sender to recipient via the Delivery Server 36. In this first preferred embodiment of the invention, the Delivery Server is directed by the sender to communicate with a certificate authority database server 38 to retrieve the intended recipient's public key (certificate). The Delivery Server dynamically queries the certificate authority and retrieves the public key. The public key is transmitted to the Delivery Server and from there to the sender. In alternative embodiments of the invention, the Delivery Server retrieves the intended recipient's public key from the intended recipient's desktop computer, an Internet server, or from an intranet server connected to the intended recipient's desktop computer.

In the first preferred embodiment of the invention, the sender encrypts the document using a secret key and uses the public key to encrypt the secret key. The document and encrypted secret key are then transmitted to the intended recipient. The secret key is decrypted with the intended recipient's private key and is then used to decrypt the document.

In an alternative, equally preferred embodiment, the sender uses the public key to encrypt the document. The encrypted document is then transmitted to the intended recipient and decrypted using the private key associated with the public key.

Figure 4:
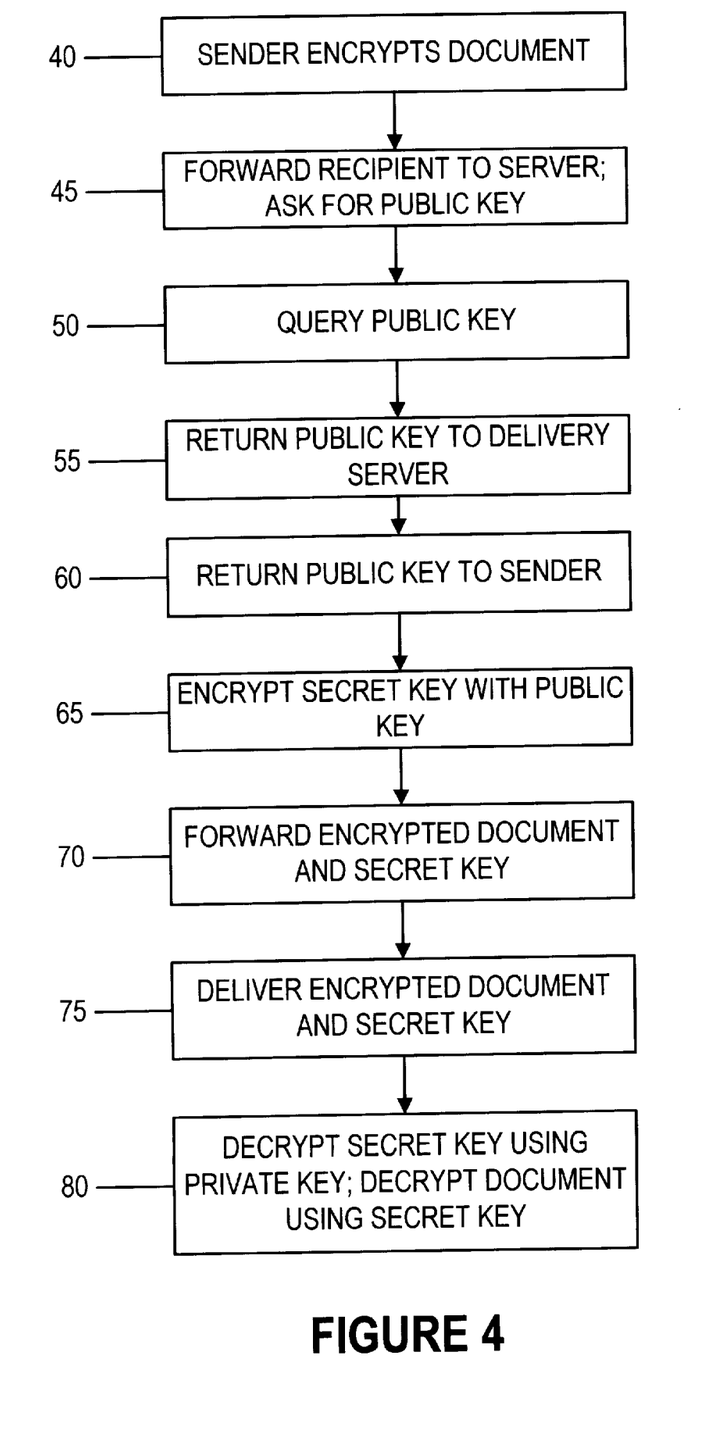
FIG. 4 is a flow chart of the set of operations for dynamic server document encryption according to a first preferred embodiment of the invention.

FIG. 4 is a flow chart of the set of operations for dynamic server document encryption, according to a first preferred embodiment of the invention. In the example, the sender encrypts the document 40 using a secret key. Such secret key includes any appropriate encryption scheme known in the prior art. The sender then contacts a Delivery Server 45 to query 50 the public key associated with the intended recipient. The Delivery Server retrieves this certificate in real time 55, for example from the data base of a certificate authority, and transmits the certificate back to the sender 60.

In the event that the certificate authority returns no certificate, the Delivery Server dynamically generates a new certificate for the recipient. To do so, the Delivery Server forwards a dynamically generated URL in an e-mail message to the recipient. Recipient access of the URL dynamically retrieves a Java Applet or Plug-in, which is automatically downloaded to the recipient's system. This applet or Plug-in then runs on the Recipient system and constructs a private/public key pair. Generating a private/public key pair on a local machine is not specific to this invention and is documented in a number of sources.

The applet or plug-in next forwards the public key to the Delivery Server. The server, using properties of the generated URL, identifies the e-mail address of the recipient. Thus, the generated public key has the property of having authenticated the e-mail address of the recipient, as the URL to invoke the key generation has only been forwarded to a specific e-mail address. The server combines the e-mail address and public key into a certificate and returned to the Send Client or used by the server to encrypt the document or secret key. The Delivery Server, using LDAP or a similar protocol, may communicate the certificate to the certificate authority. Alternatively, the Delivery Server simply may maintain a local database or dynamically generated certificates for future use.

Upon receiving the public key from the Delivery Server, the sender encrypts the secret key 65 with the public key. In an alternative, equally preferred embodiment of the invention, the sender does not encrypt the document until the public key has been received. Because the document is not encrypted if the public key is not authenticated, this embodiment minimizes processing time when a public key cannot be retrieved.

The sender then forwards 70 the encrypted document, the address of the intended recipient (for example an email address), delivery instructions, and the encrypted secret key to the Delivery Server over a secure channel. Thus, the document does not leave the Sender until the document has been encrypted with the secret key and the secret key has been encrypted with the intended recipient's public key. The Delivery Server then delivers 75 the encrypted document and secret key to the intended recipient. The intended recipient, using the private key associated with the public key, decrypts the secret key 80 and uses the secret key to decrypt the document. Such scheme prevents unauthorized access to the document, since the document can only be accessed by the owner of the public key.

Figure 5:
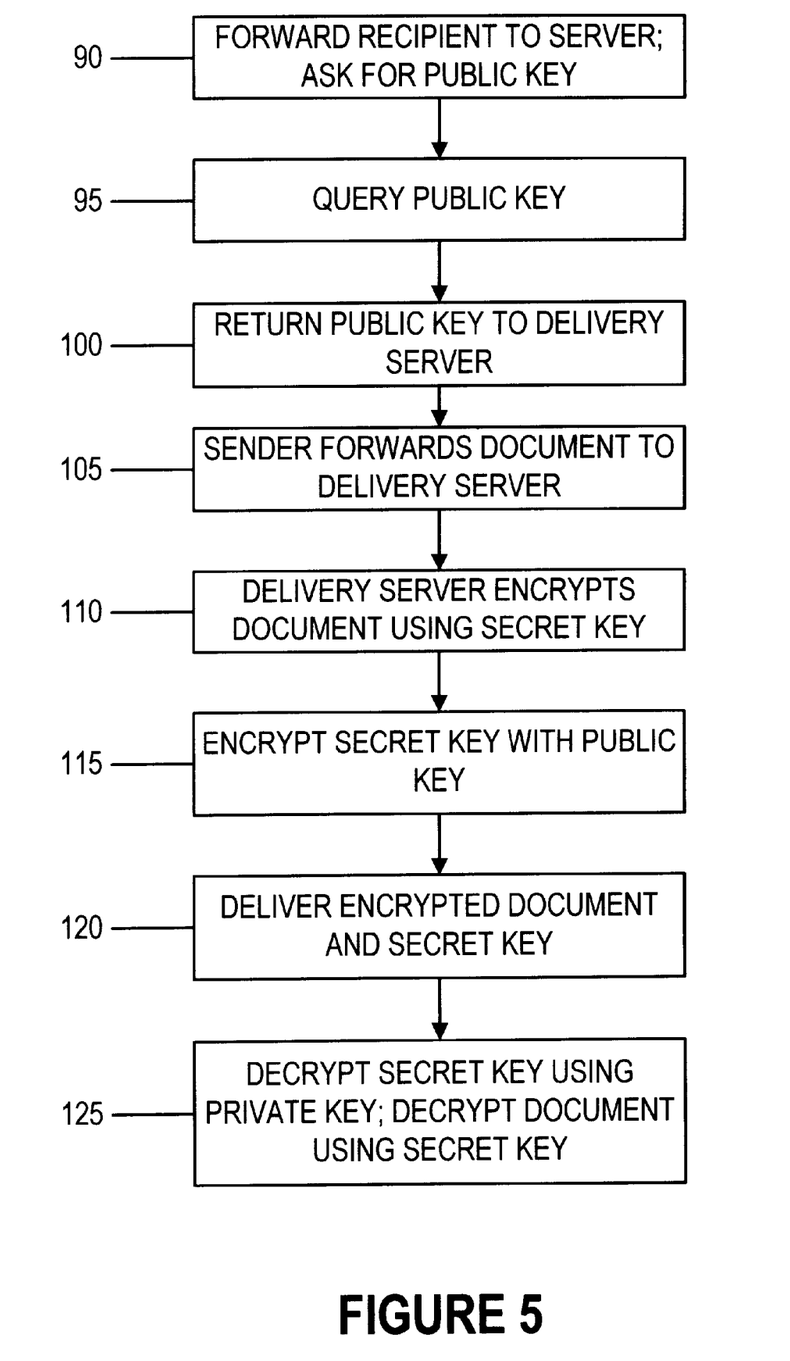
FIG. 5 is a flow chart of the set of operations for dynamic server document encryption according to an alternative embodiment of the invention.

FIG. 5 is a flow chart of the set of operations for dynamic server document encryption, according to an alternative embodiment of the invention. The sender notifies the Delivery Server 90 that the sender intends to send a document to a given recipient. The Delivery Server queries 95 the certificate authority to obtain the intended recipient's public key, which is returned 100 to the Delivery Server.

In this embodiment, the Sender does not encrypt the document but forwards the document 105 to the Delivery Server over a secure channel. The Delivery Server then encrypts 110 the document using a secret key. The Delivery Server uses the retrieved public key of the intended recipient to encrypt 115 the secret key, and then forwards the encrypted document and secret key to the intended recipient 120. The intended recipient uses the private key to decrypt the secret, and then uses the secret key to decrypt the document 125.

Alternatively, the Delivery Server may use the public key to encrypt the document. The encrypted document is then transmitted to the recipient.

In the preferred implementation of the invention, the sender is connected to the intended recipient via a Delivery Server, all running over a wide area network, such as the Internet. The sender is preferably a computer using software referred to herein as the Send Client.

The Delivery Server is responsible for determining the public key of a given recipient and forwarding that key to the Send Client. The Delivery Server is also responsible for delivering the encrypted document and secret key to the intended recipient.

The Send Client initiates the delivery transaction by first identifying the document to be delivered, any delivery parameters, and the set of intended recipients to receive the document. Delivery parameters include such options as the scheduled delivery time, security options, urgency of the delivery, presentation parameters for the delivery, and receipt notification.

The Send Client then initiates a dialog with the Delivery Server and encrypts the document with a secret key. The dialog and encryption steps may be performed simultaneously or sequentially, depending upon the sender's hardware and software configuration. In the dialog, the Send Client forwards to the Delivery Server the intended recipient(s) of a given document. The Send Client requests that the Delivery Server contact the Send Client once the public key has been acquired.

The Send Client expresses the identity of the intended recipient(s) of a given document in different ways. In the preferred embodiment of the invention, the Send Client uses the electronic mail (email) address of the intended recipient as the identifier of the intended recipient. However, the Send Client can also identify the intended recipient with an alternative identifier, such as a driver's license number, a social security number, an abstract identifier, a symbol name, or a fax number.

The Delivery Server uses several techniques to obtain the certificate for the intended recipient. In the preferred embodiment of the invention, the Delivery Server contacts a certificate authority data base server, presents information identifying the intended recipient, and asks for the intended recipient's public key. The invention may therefore be used to obtain information from certificate authorities that maintain public key data bases that can be accessed dynamically over a programmatic interface (queried) in real time.

The invention is implemented using any appropriate means for a Delivery Server to query a public key of an intended recipient in real time without user intervention. Thus, the specific protocol and means of accessing the public key data base are not significant for the invention. The public key data base is preferably accessed using the Internet Lightweight Directory Access Protocol (LDAP) standard developed by the University of Michigan in conjunction with the Internet Engineering Task Force. LDAP servers provide directory and other services. Using LDAP protocol, a given server may be queried, and information maintained on that server may be retrieved over an electronic network. LDAP servers can be queried directly using standard Internet protocols. Alternative embodiments of the invention use, for example, SQL Queries with different connectivity protocols including RPC (remote procedure call).

The certificate authority data base server and the Delivery Server may be either the same or separate servers. Maintaining both the certificate authority data base and the Delivery Server on the same server is advantageous for a dedicated application of document delivery which does not require access to a general data base of certificates. For example, a corporation may maintain a database of employees' public keys on the same server used for Internet communications. The same server is therefore used as the certificate authority data base and as the Delivery Server for interoffice communication within the company.

For embodiments in which the certificate authority data base server and the Delivery Server are separate, the Delivery Server may maintain a cache or local copy of recently queried certificates. Use of such cache saves time in future queries for the same recipient and certificate.

The invention supports document delivery to one or more recipients. For multiple recipients, the process discussed above is applied in batch mode. An ordered list of intended recipients is forwarded to the Delivery Server, and the Delivery Server returns a corresponding ordered list of certificates.

The invention may also be used to send multiple documents from sender to recipient(s). In such case, a single secret key is used to encrypt each document. Once the Delivery Server has returned a certificate containing each recipient's public key, the single secret key is encrypted with the retrieved public key(s) of the intended recipient(s). For each recipient, the Send Client forwards an encrypted secret key and the encrypted document(s) to the Delivery Server, along with the intended recipient address and delivery parameters.

The Delivery Server then forwards to each recipient the combined encrypted secret key and document(s). The recipient device uses software known as the Receive Client. The Receive Client is currently implemented as a Java Applet as well as a plug-in to standard internet browsers. Java is a programming language developed by Sun Microsystems of Mountain View, Calif. However, the Receive Client may also be implemented using any other programming language that is capable of receiving and decrypting the transmitted secret key and document(s).

When implemented as a Java Applet, the Receive Client is distributed dynamically from the Delivery Server to the intended recipient's system. The Receive Client uses the privtate key to decrypt the secret key. This decrypted secret key is then used by the recipient to decrypt the document(s).

In the preferred embodiment of this invention, the Receive Client accesses the encrypted secret key and document from the Delivery Server using Hypertext Transmission Protocol (HTTP), the standard internet delivery protocol. However, the Receive Client may access the Delivery Server using any other appropriate protocol.

When using HTTP, the Receive Client is sent a uniform resource locator (URL) containing the address of the documents and key to be delivered. In the preferred embodiment of the invention, the document(s) and secret key are packaged into a single file or stream of data, which is delivered intact to the Receive Client using HTTP. The Receive Client is thereby given maximal flexibility to retrieve the package and decrypt it from the recipient(s) web browser. The recipient may use any web browser or other software application that is capable of receiving the data transmitted over the wide area network.

Although the invention is described herein with reference to the preferred embodiment, one skilled in the art will readily appreciate that other applications may be substituted for those set forth herein without departing from the scope of the present invention.

The source code for the Send Client, the Receive Client, and for the Delivery Server software can be readily configured by one skilled in the art using well-known programming techniques and hardware components. Additionally, Send Client and Delivery Server functions may also be accomplished by other means, including integrated circuits and programmable memory devices such as an EEPROM.

The implementation of the dynamic server document encryption discussed above with regard to the preferred embodiment of the invention is only one possible implementation. Alternate embodiments may use other implementations consistent with the teachings of the invention.

The Receive Client may be configured to direct a document to another device. For example, a decrypted document may be sent to a printer or a fax machine.

The invention may use any appropriate encryption scheme for the secret key, public key, and private key, including the RSA and Verisign schemes.

Accordingly, the invention should only be limited by the Claims included below.

We claim:

1. A method for secure document delivery from a sender over a wide area network, comprising the steps of:

a sender encrypting a document using a secret key;

the sender contacting a Delivery Server to query a public key associated with an intended recipient;

the Delivery Server dynamically retrieving the public key in real time from a certificate authority;

the Delivery Server transmitting the public key back to the sender;

the sender encrypting the secret key with the public key; and the sender transmitting the encrypted document and the encrypted secret key to the Delivery Server for transmission to the recipient.

2. The method of claim 1, further comprising the step of the recipient decrypting the secret key using a private key.

3. The method of claim 2, further comprising the step of the recipient decrypting the document using the secret key.

4. The method of claim 1, wherein the sender encrypts the document prior to receiving the public key from the Delivery Server.

5. The method of claim 1, wherein the sender encrypts the document subsequent to receiving the public key from the Delivery Server.

6. The method of claim 1, wherein the wherein the document is one of a contiguous collection of data, a stream of data, a video, audio data, an animation, a formatted document, or a database.

7. The method of claim 1, further comprising the step of the sender forwarding the address of the intended recipient and document delivery instructions to the Delivery Server.

8. The method of claim 1, wherein the wide area network is the Internet.

9. The method of claim 1, wherein the recipient is one of a desktop computer, a printer, a fax machine, a personal digital assistant, or a network computer device.

10. The method of claim 1, wherein the sender is one of a desktop computer, an Internet browser device, an Internet telephone device, or a network computer device.

11. The method of claim 1, wherein the database server dynamically retrieves the public key from one of a certificate authority, an Internet server, personal digital assistant, the intended recipient's desktop computer, or from an intranet server connected to the intended recipient's desktop computer.

12. A method for secure document delivery from a sender over a wide area network, comprising the steps of:
- a sender contacting a Delivery Server to query a public key associated with an intended recipient of a document;
- the Delivery Server dynamically retrieving the public key in real time from a certificate authority;
- the Delivery Server transmitting the public key back to the sender;
- the sender encrypting the document with the public key; and
- the sender transmitting the encrypted document to the Delivery Server for transmission to the recipient.

13. The method of claim 12, further comprising the step of the recipient decrypting the document using a private key.

14. The method of claim 12, wherein the recipient is one of a desktop computer, a printer, a fax machine, a personal digital assistant, or a network computer device.

15. The method of claim 12, wherein the sender is one of a desktop computer, an Internet browser device, an Internet telephone device, or a network computer device.

16. The method of claim 12, wherein the database server dynamically retrieves the public key from one of a certificate authority, an Internet server, personal digital assistant, the intended recipient's desktop computer, or from an intranet server connected to the intended recipient's desktop computer.

17. A method for secure document delivery from a sender over a wide area network, comprising the steps of:
- a sender contacting a Delivery Server to query a public key associated with an intended recipient;
- the Delivery Server dynamically retrieving the public key in real time from a certificate authority;
- the sender transmitting the document to the Delivery Server;
- the Delivery Server encrypting the document with a secret key and encrypting the secret key with the public key; and
- the Delivery Server transmitting the encrypted secret key and the encrypted document to the intended recipient.

18. The method of claim 17, further comprising the step of the recipient decrypting the secret key using a private key.

19. The method of claim 18, further comprising the step of the recipient decrypting the document using the secret key.

20. The method of claim 17, wherein the recipient is one of a desktop computer, a printer, a fax machine, a personal digital assistant, or a network computer device.

21. The method of claim 17, wherein the sender is one of a desktop computer, a network computer device, an Internet browser device, an Internet telephone device, or a fax machine.

22. The method of claim 17, wherein the database server dynamically retrieves the public key from one of a certificate authority, an Internet server, personal digital assistant, the intended recipient's desktop computer, or from an intranet server connected to the intended recipient's desktop computer.

23. The method of claim 17, further comprising the step of:
- dynamically generating a public key at said Delivery Server where said recipient does not have a public key at the time of said retrieval.

24. The method of claim 23, said dynamic generating step further comprising the steps of:
- forwarding a message to said recipient, the reading of which retrieves a module that constructs a private/public key pair on said recipient's system.

25. The method of claim 24, said dynamic generating step further comprising the step of:
- forwarding said public key from said recipient's system to said Delivery Server.

26. A system for secure document delivery from a sender over a wide area network, comprising:
- a Delivery Server for querying a public key associated with an intended recipient at the direction of a sender, the Delivery Server dynamically retrieving the public key in real time from a certificate authority and transmitting the public key back to the sender;
- the sender for encrypting a document using a secret key, the sender encrypting the secret key with the public key and the sender transmitting the encrypted document and the encrypted secret key to the Delivery Server for transmission to the intended recipient.

27. The system of claim 26, further comprising:
- means for decrypting the secret key by the recipient using a private key; and
- means for decrypting the encrypted document using the secret key.

* * * * *

UNITED STATES PATENT AND TRADEMARK OFFICE
CERTIFICATE OF CORRECTION

PATENT NO.    : 6,061,448
DATED         : May 9, 2000
INVENTOR(S)   : Jeffery C. Smith and Jean-Christophe Bandini Page 1 of 1

It is certified that error appears in the above-identified patent and that said Letters Patent is hereby corrected as shown below:

Drawings,
Sheet 4, Figure 4, step 70, line 2, replace "Secret Key" with -- Encrypted Secret Key --;
Step 75, line 2, replace "Secret Key" with -- Encrypted Secret Key --;
Step 80, line 1, replace "Decrypt Secret Key" with -- Decrypt Encrypted Secret Key --;
Sheet 5, Figure 5, step 120, line 2, replace "Secret Key" with -- Encrypted Secret Key --; and
Step 125, line 2, replace "Decrypt Secret Key" with -- Decrypt Encrypted Secret Key --.

Column 3,
Line 57, replace "The see delivers" with -- the server delivers --.

Column 8,
Line 47, replace "wherein the wherein the" with -- wherein the --;
Line 62, replace "wherein the database server" with -- wherein the Delivery Server --;

Column 9,
Line 23, replace "wherein the database server" with -- wherein the Delivery Server --;

Column 10,
Line 8, replace "wherein the database server" with -- wherein the Delivery Server.

Signed and Sealed this

Twenty-ninth Day of April, 2003

JAMES E. ROGAN
*Director of the United States Patent and Trademark Office*